(12) United States Patent
Bernat

(10) Patent No.: US 9,371,213 B1
(45) Date of Patent: Jun. 21, 2016

(54) TRIANGULAR LIFT FRAME WITH LOAD BLOCKS

(71) Applicant: General Electric Company, Schenectady, NY (US)

(72) Inventor: Steven Nicholas Bernat, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/556,924

(22) Filed: Dec. 1, 2014

(51) Int. Cl.
  *B66C 1/16* (2006.01)
  *F16G 15/08* (2006.01)

(52) U.S. Cl.
  CPC .. *B66C 1/16* (2013.01); *F16G 15/08* (2013.01)

(58) Field of Classification Search
  CPC ................................. B66C 1/16; F16G 15/08
  USPC ......... 294/81.1, 81.2, 81.21, 81.56, 67.1, 215
  See application file for complete search history.

(56) References Cited

U.S. PATENT DOCUMENTS

| | | | | |
|---|---|---|---|---|
| 2,622,540 A * | 12/1952 | Stewart et al. | | 414/800 |
| 3,021,166 A * | 2/1962 | Kempel et al. | | 294/74 |
| 3,502,364 A * | 3/1970 | Moore | | 294/67.1 |
| 3,838,836 A * | 10/1974 | Asseo et al. | | 244/137.4 |
| 4,114,770 A * | 9/1978 | Jordan et al. | | 414/680 |
| 4,397,493 A * | 8/1983 | Khachaturian et al. | | 294/81.1 |
| 4,538,849 A * | 9/1985 | Khachaturian et al. | | 294/81.1 |
| 5,352,056 A * | 10/1994 | Chandler | | 403/79 |
| 5,603,544 A * | 2/1997 | Bishop et al. | | 294/81.1 |
| 5,836,548 A * | 11/1998 | Dietz et al. | | 244/137.1 |
| 6,357,810 B1 * | 3/2002 | Schwulst | | 294/81.3 |
| 7,159,912 B2 * | 1/2007 | Gerhausser | | 294/81.56 |
| 2009/0072561 A1 * | 3/2009 | Latham | | 294/81.2 |

OTHER PUBLICATIONS

TANDEMLOC, Triangular Lift Frame, 24"-42" Span: 2 Ton, Retrieved from http://www.tandemloc.com/lifting-beams-triangular-frame-AE26000A-1PA.asp#1 on Oct. 13, 2014, 2 pages.

* cited by examiner

*Primary Examiner* — Dean Kramer
(74) *Attorney, Agent, or Firm* — Ernest G. Cusick; Hoffman Warnick LLC

(57) ABSTRACT

A triangular lift frame may include a first load block, a second load block and a third lift block, each load block including a hoist ring at each end. A first frame member extends between the first and second load blocks; a second frame member extends between the second and third load blocks; and a third frame member extends between the first and third load blocks. The frame members are arranged in a triangular fashion. In one embodiment, the triangular fashion may be such that a load force carried by each respective pair of load blocks is transmitted linearly longitudinally along a respective frame member extending between the respective pair of load blocks.

19 Claims, 5 Drawing Sheets

TRIANGULAR LIFT FRAME WITH LOAD BLOCKS

BACKGROUND OF THE INVENTION

The disclosure relates generally to lifting devices, and more particularly, to a triangular lift frame having load blocks for component loads such as a steam turbine component.

Currently, lifting a component that does not have evenly distributed weight and/or has non-symmetrical connection points, presents a number of challenges. One challenge is that the rigging arrangement may lead to damage of the component load. For example, FIG. 1 shows a three-legged bridle 10 coupled to eyelets 12 mounted directly on component 14, i.e., a steam turbine diaphragm half. As observed, each leg of the bridle 10 may rub against and damage an edge of component 14 if, for example, accurate crane operation is not implemented. One approach to minimize risk in this situation has been to reduce the size of the eyelet, but this is difficult to implement in the field. As shown in FIG. 2, where a swivel hoist ring 16 is used with a three-legged bridle, the ring may also impact an edge of component 14.

Another approach to address the above-identified challenge is to implement a triangular lift frame that includes frame members that are coupled by vertical, welded gussets. The gussets include connection points for hoist rings. This approach presents a number of challenges because the gussets, welds and frame members are all carrying the load of the component. In addition, since the gussets are simply vertically welded to the frame members, the load transmission to the frame members may include an amount of torsion on the frame members and/or shear on the welds. Application of this approach therefore can be limited.

In any conventional approach, damage to industrial components, such as turbine diaphragms, due to improper lifting can result in required repairs resulting in delivery delays and unnecessary costs. In the steam turbine setting, the costs can be extensive considering hundreds of steam turbine diaphragms may be handled each year during plant outages and repair activities in service shops. Similar damage and cost problems exist for other industries.

BRIEF DESCRIPTION OF THE INVENTION

A first aspect of the disclosure provide a lift frame, comprising: a first load block, a second load block and a third lift block, each load block including a hoist ring at each end; a first frame member extending between the first and second load blocks; a second frame member extending between the second and third load blocks; and a third frame member extending between the first and third load blocks, wherein the frame members are arranged in a triangular fashion.

A second aspect of the disclosure provides a triangular lift frame, comprising: a first load block, a second load block and a third lift block, each load block including a swivel hoist ring at each end; a first frame member extending between the first and second load blocks; a second frame member extending between the second and third load blocks; and a third frame member extending between the first and third load blocks, wherein the frame members are arranged in a triangular fashion such that a load force carried by each respective pair of load blocks is transmitted linearly longitudinally along a respective frame member extending between the respective pair of load blocks.

A third aspect of the disclosure provides a triangular lift frame, comprising: a first load block, a second load block and a third lift block, each load block having a substantially cylindrical body and including a swivel hoist ring threadably coupled to each end; a first frame member extending between the first and second load blocks; a second frame member extending between the second and third load blocks; a third frame member extending between the first and third load blocks; and a gusset coupled between at least one pair of adjacent frame members, wherein the frame members are arranged in a triangular fashion such that a load force carried by each respective pair of load blocks is transmitted linearly longitudinally along a respective frame member extending between the respective pair of load blocks.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a lift frame that is triangular. Lift frame 100, also sometimes referred to as a lifting strongback, allows safe handling of non-symmetric vertical load components, e.g., with 3 non-symmetric load connection points, and allows a single hook to lift the load through the use of unique and custom-shaped, corner load blocks. The lift frame improves and enhances the safety involved with lifting industrial components (such as but not limited to turbine components such as steam turbine diaphragm halves), and maintains the full lifting capacity of rigging components. The load blocks allow for the full load transfer through the block from a vertical orientation to an angular orientation, and linearly longitudinally to the frame members. The use of the load blocks allows for a vertical connection to the component and eliminates the contact and interference that causes damage and the need for rework of the component. The use of the load blocks, in contrast to gussets as is conventional, also reduces torsion and/or shear stresses that may be applied to welds, etc., within the lift frame. The arrangement of the load blocks and frame members that connect them allow for lifting components that are difficult to lift using normal rigging apparatus.

Figure 1:
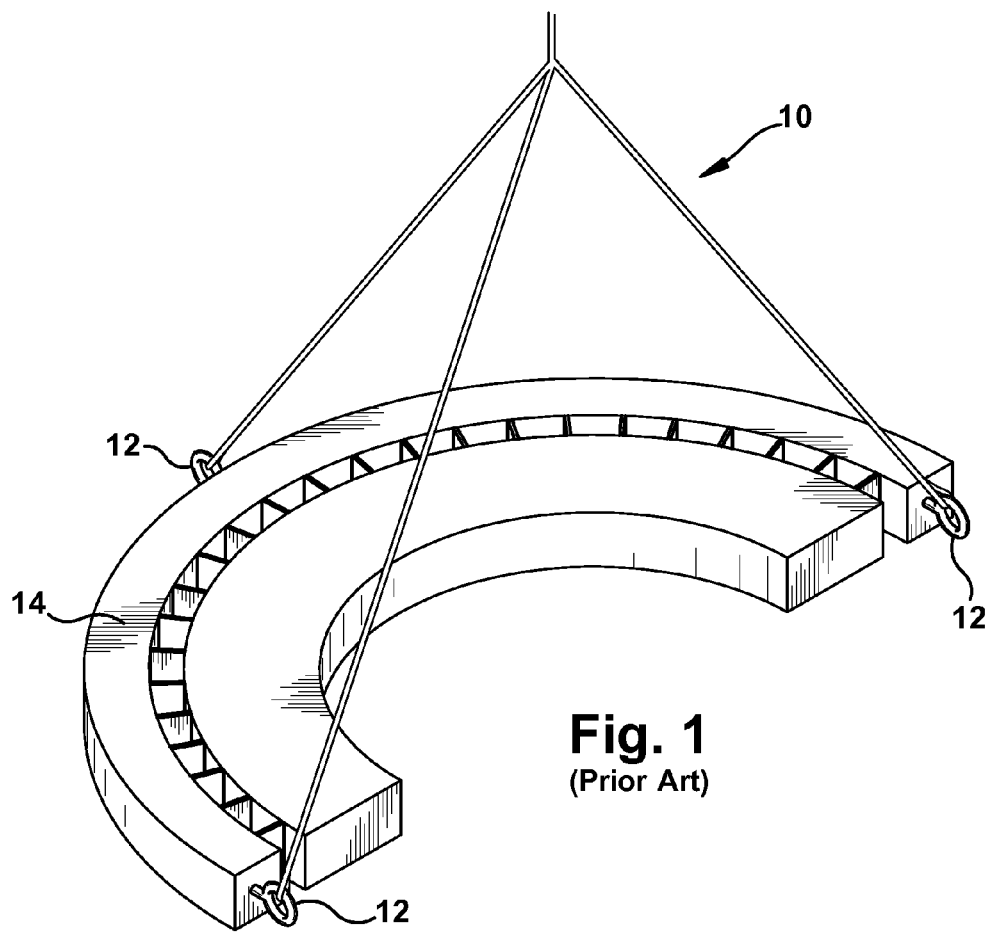
FIG. 1 shows a conventional three-legged bridle coupled to a steam turbine diaphragm half.
Figure 2:
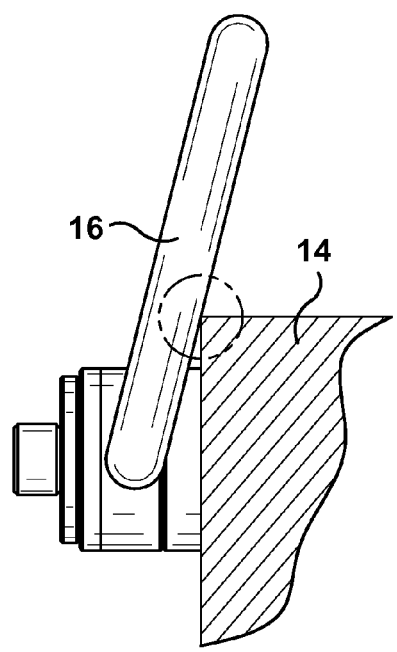
FIG. 2 shows a conventional swivel hoist ring coupled to the component of FIG. 1.
Figure 3:
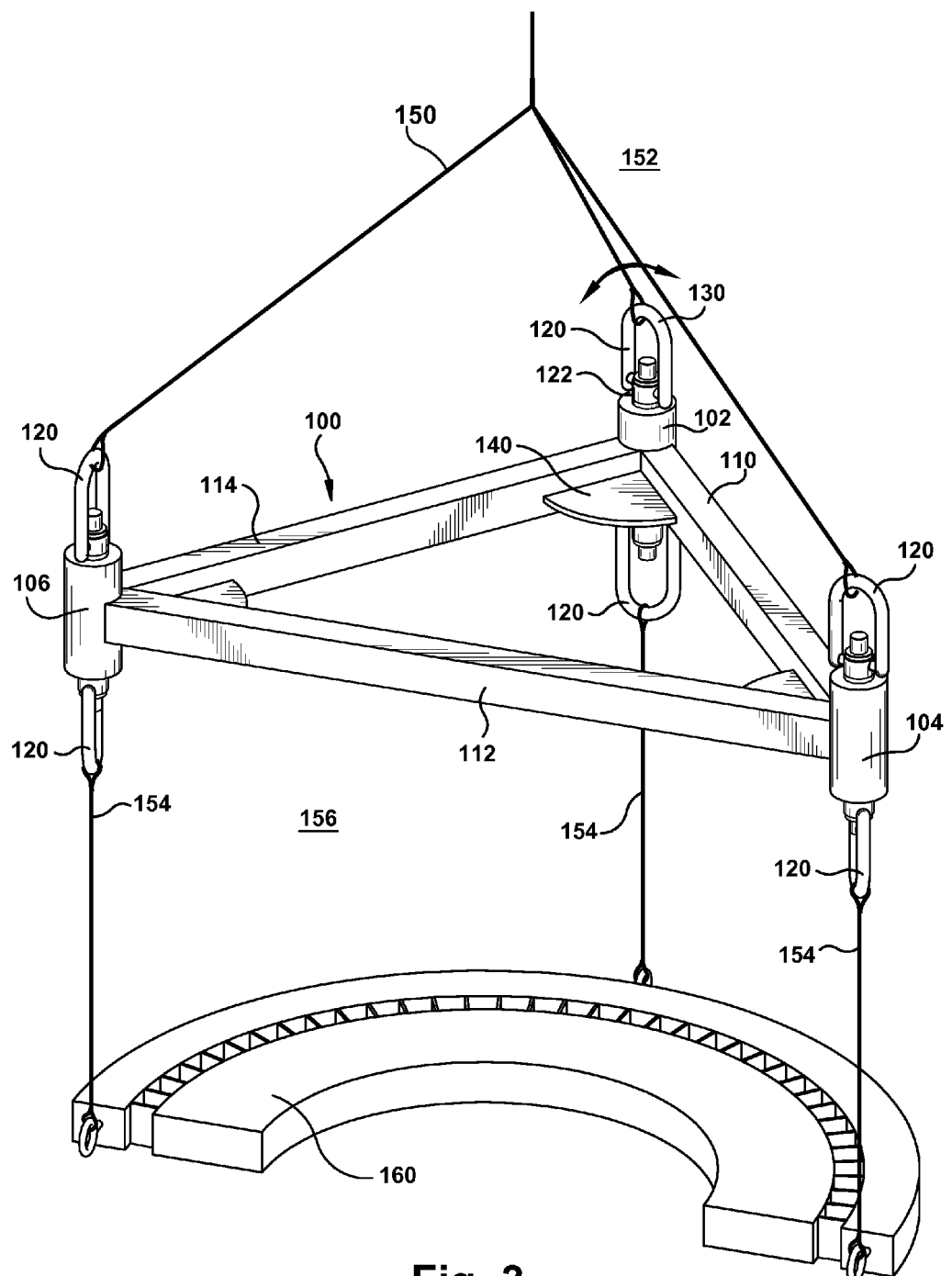
FIG. 3 shows a perspective view of a triangular lift frame according to embodiments of the invention.
Figure 4:
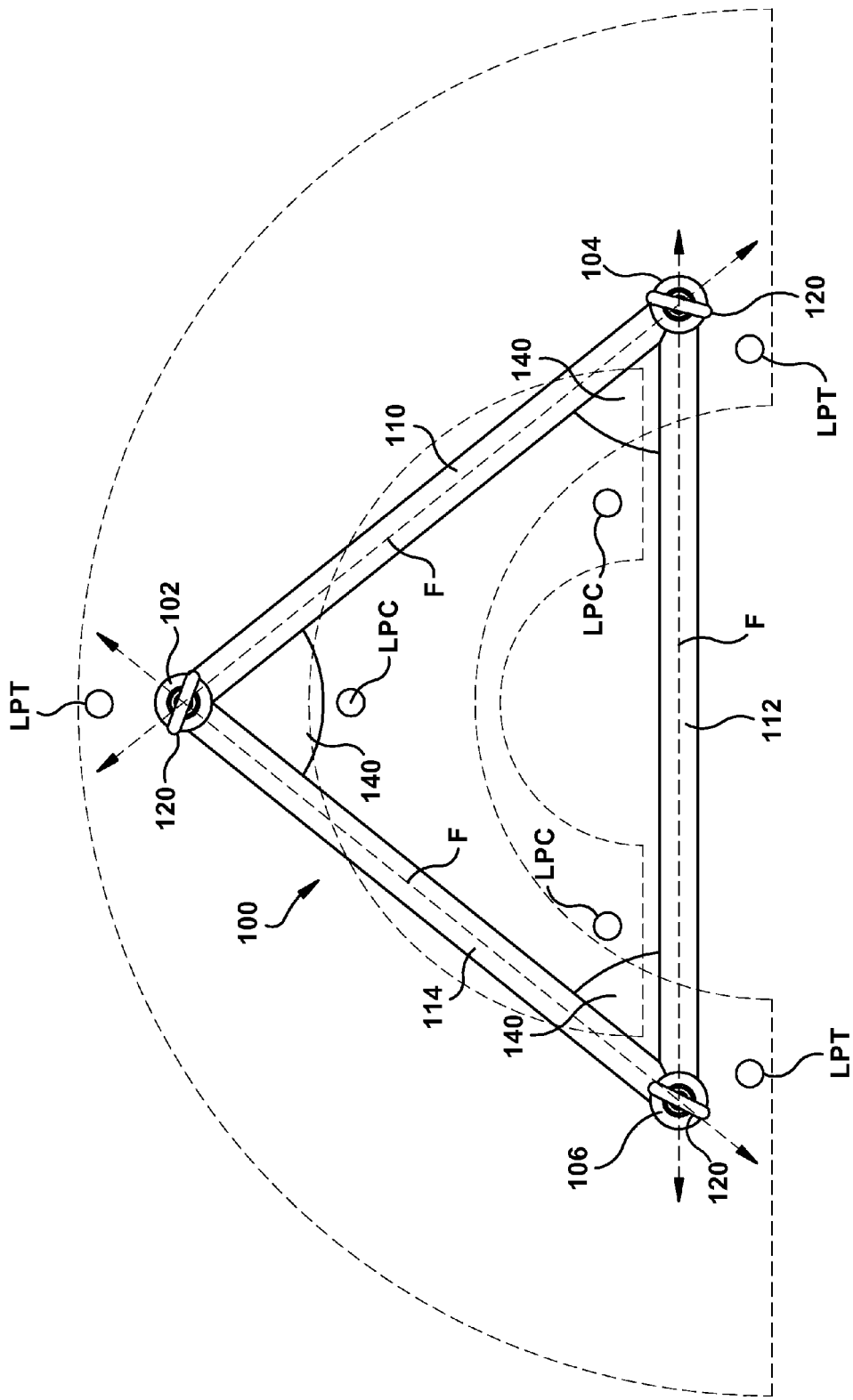
FIG. 4 shows a plan view of a triangular lift frame according to embodiments of the invention.

Referring to FIGS. 3 and 4, a perspective and plan view, respectively, of a lift frame 100 according to embodiments of the invention is illustrated. Lift frame 100 may include a first load block 102, a second load block 104 and a third lift block 106. As will be described, pairs of load blocks are coupled together by frame members 110, 112, 114. Each load block 102, 104, 106 may be made of a block of material that has a volume beyond a planar element such as a planar gusset. Load blocks 102, 104, 106 may be made of any appropriately strong material such as carbon or hardened steel, or other appropriate materials having sufficient strength to withstand the loads carried by lift frame 100. A thickness and horizontal dimensions of load blocks 102, 104, 106 may be determined by the load that they will carry.

Figure 5:
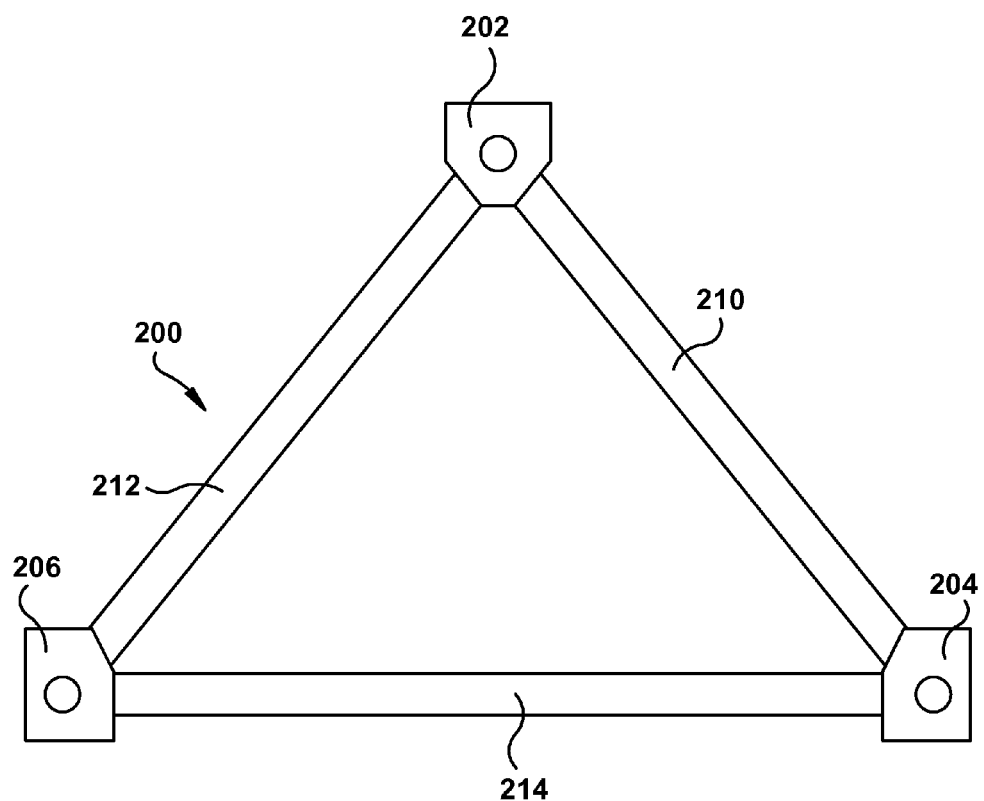
FIG. 5 shows a perspective view of a triangular lift frame according to alternative embodiments of the invention.

In one embodiment, each load block 102, 104, 106 has a substantially cylindrical body. However, this shape is not necessary in all instances. For example, FIG. 5 shows an alternative lift frame 200 having load blocks 202, 204, 206 having a pentagonal cross-sectional shape. In this case, the pentagonal shape may be any configuration allowing for alignment of frame members 210, 212, 214, as will be described herein. While the description that follows shall refer only to the FIGS. 3-4 embodiment, the teachings are equally applicable to the FIG. 5 embodiment.

Figure 6:
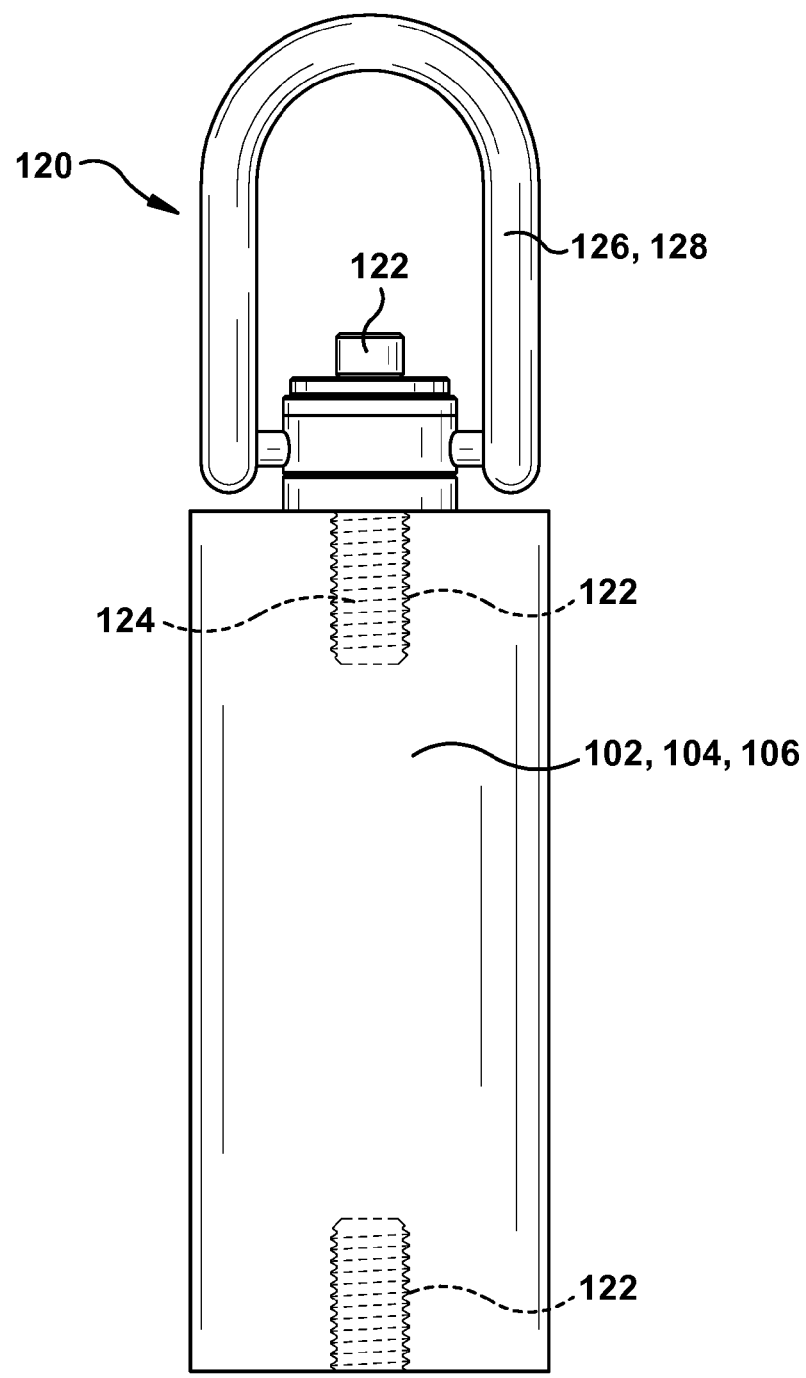
FIG. 6 shows a cross-sectional view of one embodiment of a load block according to embodiments of the invention.

Returning to FIG. 3, each load block 102, 104, 106 may include a hoist ring 120 at each end. Each hoist ring 120 may include any now known or later developed hoist ring capable of carrying the desired loads. As shown best in FIG. 6, each load block 102, 104, 106 includes a threaded bore 122 at each end by which a hoist ring 120 (only one shown) may be threadably coupled. Threaded bore 122 may be sized for the appropriate load-rated hoist rings 120 according to the weight being lifted as are any other necessary connectors. In one embodiment, shown best in FIG. 3, threaded bores within load blocks 102, 104, 106 may be approximately aligned with lifting points on a component 160 to allow for a vertical (or nearly vertical) connection. In the example shown in FIG. 6, each hoist ring 120 may include a base 122 having a threaded mount 124 for threadably coupling with threaded bore 122, and an eyelet 126 coupled to base 120 for connecting to a lifting apparatus (not shown), e.g., a bridle. In one embodiment, as shown in FIG. 6, each hoist ring 120 may include a fixed eyelet 128 that does not pivot relative to base 122. In an alternative embodiment, shown for load block 102 only in FIG. 3, hoist ring 120 may include an eyelet 130 that pivots about a horizontal axis to base 122 (arrows in FIG. 3). In this case, hoist ring 120 may be referred to as a swivel hoist ring. In either embodiment, hoist ring 120 may rotate about a vertical axis of base 122. As understood, each pivoting/rotating movement accommodates pulling by whatever form of lifting force application may be used to couple to hoist ring 120.

Returning to FIGS. 3 and 4, lift frame 100 also includes a first frame member 110 extending between first load block 102 and second load block 104. A second frame member 112 extends between second load block 104 and third load block 106. And, a third frame member 114 extends between first load block 102 and third load block 106. Frame members 110, 112, 114 are arranged in a triangular fashion. Frame members 110, 112, 114 may also be referred to in the art as spreader beams. Where the anticipated loads allow, each frame member 110, 112, 114 may include any conventional telescope function so that its length may be adjusted. Each load block 102, 104, 106 may be coupled to a respective pair of frame members by a weld, e.g., of any now known or later developed weld material having sufficient strength to handle the loads and environment anticipated for lift frame 100. Frame members 110, 112, 114 may take a variety of forms. For example, each frame 110, 112, 114 may have a configuration of an I-beam, channel, tubing or other elongated structure. Each frame member end is shaped to accommodate its mating with a respective load block. For example, for the FIG. 4 embodiment, each end of frame members 110, 112, 114 includes a vertically cylindrical cut out sized to mate with an outer surface of the substantially cylindrical load blocks, and perhaps, where the angles require, a neighboring frame member. In FIG. 6, the ends of frame members 210, 212, 214 may be angled to mate with an exterior surface of appropriate load blocks 202, 204, 206, e.g., angled at acute angles 35°, 45°, etc., or angle at 90°. In any event, frame members 110, 112, 114 create a triangular lift frame, which may have two or three sides of the triangle of equal length. However, this is not necessary in all instances as the length of frame members 110, 112, 114 may be determined by the size, shape and/or weight of the component to be lifted. Frame members 110, 112, 114 may be made of any of the materials listed herein for load blocks 102, 104, 106.

In conventional triangular lift frames, load blocks 102, 104, 106 are replaced with vertical, planar gussets, which expose the welds, frame members and gussets to the load. In addition, the load applied to the gussets may create a torque on the frame members and/or shear force on the welds. In contrast to conventional triangular lift frames, however, lift frame 110 includes frame members 110, 112, 114 that are coupled to a respective pair of load blocks such that a load force (dashed arrows F in FIG. 4) is carried by each respective pair of load blocks is transmitted linearly longitudinally along a respective frame member extending between the respective pair of load blocks. That is, the vectors of the load force applied by a component 160 load to a particular load block are directly linearly along a longitudinal axis of the frame members coupled to the particular load block. Consequently, no shear is applied to the welds. For example, where load blocks 102, 104, 106 are spaced outside of lifting points (LPC) of a component (not shown for clarity) load, the load force is transmitted as a compressive force linearly longitudinally along each frame member. In contrast, where load blocks 102, 104, 106 are spaced inside of lifting points (LPT) of a component (not shown for clarity) load, the load force is transmitted as a tensile force linearly longitudinally along each frame member. Obviously, where lift point locations are inside and outside load blocks 102, 104, 106, certain frame members may observe a compressive force and other(s) may observe a tensile force. In any event, little to no shear is applied to the welds coupling frame members 110, 112, 114 to respective load blocks 102, 104, 106 in lift frame 100 because of the use of the load blocks.

As shown in FIG. 4, in one embodiment, a gusset 140 may be coupled between at least one pair of adjacent frame members 110, 112, 114. While three gussets 140 are shown, three may not be necessary in all situations.

Any variety of rigging apparatus may be used to couple lift frame 100 to a lifting device such as a crane or to component 160. For example, in one embodiment, lift frame 100 may also include, as shown in FIG. 3, a three-legged bridle 150 for a lifting device coupling end 152 (e.g., upper end) of lift frame 100. Each leg of the three-legged bridle may be configured to be coupled to a respective one of load blocks 102, 104, 106, e.g., by hoist rings 120 and other connectors. Optionally, two fixed length legs with a come-a-long or chain-fall (or other, as appropriate) on the third leg can be used to allow lift frame 100 to also make transition lifts from the vertical to horizontal position or vice-a-versa. In addition, three lift cables 154, each configured to be coupled to one of load blocks 102, 104, 106 on a component coupling end 156 (e.g., lower end) of lift frame 100 may also be provided. Each leg of bridle 150 and each lift cable 154 may include any now known or later developed length of material appropriate for lifting the particular loads anticipated, e.g., chains, cables, wire, etc. In any event, hoist rings 120 on end 156 of lift frame 100 act as points of attachment for standard rigging, e.g., lift cable 154, used to connect lift frame 100 to component 160. Hoist rings 120 on end 152 of lift frame 100 serve as points of attachment for user selected rigging apparatus such as bridle 150. As described herein, three load blocks 102, 104, 106 transfer the three non-symmetric vertical loads to a single point hook connection without a reduction in the load capacity of the rigging. Thus, lift frame 100 satisfies acceptable rigging parameters, enhances lifting safety, and prevents component damage.

Lift frame 100 may be fabricated using custom machined load blocks 102, 104, 106 and frame members 110, 112, 114 to maintain the proper spacing of the load blocks. The size and spacing may be determined by the size, shape and/or weight of component 160 that is to be lifted. The use of hoist rings 120, and in particular, swivel hoist rings, allows lift frame 100 of a specific size to accommodate a range of component 160 sizes since some angular variation from vertical is permissible provided that the rigging equipment does not contact the component at any point. Load blocks 102, 104, 106 maintain the lifting connection to component 160 in a vertical direction and then transfers that load through the blocks to the top rigging. All items may be scaled larger for heavier items requiring a greater load capacity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A lift frame, comprising:
a first load block, a second load block and a third load block, each load block including a hoist ring at each end, at least one of the hoist rings including a swivel hoist ring,
wherein each load block includes a substantially cylindrical body;
a first frame member extending between the first and second load blocks;
a second frame member extending between the second and third load blocks; and
a third frame member extending between the first and third load blocks,
wherein the frame members are arranged in a triangular fashion, and
wherein each load block has a longitudinal axis oriented perpendicular to a longitudinal axis of each of the frame members.

2. The lift frame of claim 1, wherein each swivel hoist ring is threadably coupled to a respective load block.

3. The lift frame of claim 1, wherein each frame member is coupled to a respective pair of load blocks such that a load force carried by each respective pair of load blocks is transmitted linearly longitudinally along a respective frame member extending between the respective pair of load blocks.

4. The lift frame of claim 3, wherein the load force is transmitted as a compressive force linearly longitudinally along each frame member in response to the load blocks being spaced outside of lifting points of a component load.

5. The lift frame of claim 1, further comprising a gusset coupled between at least one pair of adjacent frame members.

6. The lift frame of claim 1, further comprising a three-legged bridle for a lifting device coupling end of the lift frame, wherein each leg of the three-legged bridle is configured to be coupled to a respective one of the load blocks.

7. The lift frame of claim 1, further comprising three lift cables, each lift cable configured to be coupled to one of the load blocks on a component coupling end of the lift frame.

8. The lift frame of claim 1, wherein each load block is coupled to a respective pair of lift frames by a weld.

9. The lift frame of claim 1, wherein each frame member has a configuration selected from the group consisting of: I-beam, channel and tubing.

10. The lift frame of claim 1, wherein each frame member includes a vertically cylindrical cut out sized to mate with an outer surface of the load blocks.

11. A triangular lift frame, comprising:
a first load block, a second load block and a third load block, each load block including a swivel hoist ring at each end,
wherein each load block includes a substantially cylindrical body;
a first frame member extending between the first and second load blocks;
a second frame member extending between the second and third load blocks; and
a third frame member extending between the first and third load blocks,
wherein the frame members are arranged in a triangular fashion such that a load force carried by each respective pair of load blocks is transmitted linearly longitudinally along a respective frame member extending between the respective pair of load blocks,
wherein each load block has a longitudinal axis oriented perpendicular to a longitudinal axis of each of the frame members.

12. The lift frame of claim 11, wherein each swivel hoist ring is threadably coupled to a respective load block.

13. The lift frame of claim 11, wherein the load force is transmitted as a compressive force linearly longitudinally along each frame member in response to the load blocks being spaced outside of lifting points of a component load.

14. The lift frame of claim 11, further comprising a gusset coupled between at least one pair of adjacent frame members.

15. The lift frame of claim 11, further comprising a three-legged bridle for a lifting device coupling end of the lift frame, wherein each leg of the three-legged bridle is configured to be coupled to a respective one of the load blocks.

16. The lift frame of claim 11, further comprising three lift cables, each lift cable configured to be coupled to one of the load blocks on a component coupling end of the lift frame.

17. The lift frame of claim 11, wherein each frame member has a configuration selected from the group consisting of: I-beam, channel and tubing.

18. The lift frame of claim 11, wherein each frame member includes a vertically cylindrical cut out sized to mate with an outer surface of the load blocks.

19. A triangular lift frame, comprising:
- a first load block, a second load block and a third load block, each load block having a substantially cylindrical body and including a swivel hoist ring threadably coupled to each end;
- a first frame member extending between the first and second load blocks;
- a second frame member extending between the second and third load blocks;
- a third frame member extending between the first and third load blocks; and
- a gusset coupled between at least one pair of adjacent frame members,
- wherein the frame members are arranged in a triangular fashion such that a load force carried by each respective pair of load blocks is transmitted linearly longitudinally along a respective frame member extending between the respective pair of load blocks,
- wherein each load block has a longitudinal axis oriented perpendicular to a longitudinal axis of each of the frame members.

* * * * *